US008928586B2

(12) United States Patent
Hamachi et al.

(10) Patent No.: US 8,928,586 B2
(45) Date of Patent: Jan. 6, 2015

(54) STEREOSCOPIC DISPLAY DEVICE

(75) Inventors: Jun Hamachi, Osaka (JP); Yukio Mizuno, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 111 days.

(21) Appl. No.: 13/816,984

(22) PCT Filed: Aug. 17, 2011

(86) PCT No.: PCT/JP2011/068595
§ 371 (c)(1),
(2), (4) Date: Feb. 14, 2013

(87) PCT Pub. No.: WO2012/026372
PCT Pub. Date: Mar. 1, 2012

(65) Prior Publication Data
US 2013/0141330 A1 Jun. 6, 2013

(30) Foreign Application Priority Data

Aug. 24, 2010 (JP) ................................. 2010-187505

(51) Int. Cl.
*G09G 5/00* (2006.01)
*G02B 27/00* (2006.01)
*G02B 27/22* (2006.01)
*H04N 13/04* (2006.01)

(52) U.S. Cl.
CPC ............ *G09G 5/003* (2013.01); *G02B 27/0093* (2013.01); *G02B 27/225* (2013.01); *H04N 13/0468* (2013.01)
USPC ............................. 345/156; 359/462; 345/204

(58) Field of Classification Search
CPC ........... G02B 27/0093; G02B 27/2214; G02B 27/22; G02B 27/225; H04N 13/0468; H04N 13/0022; H04N 13/0404; H04N 13/0409; H04N 13/0007; H04N 13/004; H04N 13/0472; H04N 13/0477; H04N 13/0481; H04N 21/4882; G09G 3/003
USPC ..................... 345/32, 204, 690; 359/462–477
See application file for complete search history.

(56) References Cited

U.S. PATENT DOCUMENTS 6,055,013 A    4/2000  Woodgate et al.

FOREIGN PATENT DOCUMENTS

JP    10-78562     3/1998
JP    10-271536    10/1998
(Continued)

OTHER PUBLICATIONS

International Search Report for PCT/JP2010/068595, mailed Oct. 25, 2011.

*Primary Examiner* — Stephen Sherman
(74) *Attorney, Agent, or Firm* — Nixon & Vanderhye, P.C.

(57) ABSTRACT

An object of the present invention is to provide a novel stereoscopic display device that allows the viewer to properly view a stereoscopic image. The device includes: a display configured to display an image for stereoscopic viewing; an imaging unit configured to image a face of a viewer; a position information acquisition unit configured to acquire position information regarding the face imaged by the imaging unit; an operation unit configured to be operated by the viewer when the viewer is in an optimal position from where the image for stereoscopic viewing displayed on the display can be properly viewed as a stereoscopic image; an optimal position information storage unit configured to store position information provided when the operation unit is operated as position information on the optimal position; and a positional relationship notification unit configured to notify the viewer of the positional relationship between the current position of the viewer and the optimal position.

6 Claims, 9 Drawing Sheets

(56) References Cited

FOREIGN PATENT DOCUMENTS

| JP | 2003-169351 | 6/2003 | |
| JP | 2003-262827 | 9/2003 | |
| JP | 2009250987 A | * 10/2009 | |

* cited by examiner

STEREOSCOPIC DISPLAY DEVICE

This application is the U.S. national phase of International Application No. PCT/JP2011/068595, filed 17 Aug. 2011, which designated the U.S. and claims priority to Japan Application No. 2010-187505, filed 24 Aug. 2010, the entire contents of each of which are hereby incorporated by reference.

TECHNICAL FIELD

The present invention relates to stereoscopic display devices.

BACKGROUND ART

Stereoscopic display devices capable of displaying stereoscopic images without using special glasses are known. JP 2003-262827 A (Patent Document 1) discloses a stereoscopic display device using binocular parallax.

In the case of a stereoscopic display device using binocular parallax, a stereoscopic image can be properly viewed from limited positions. As such, the viewer must be guided to a position from where such a stereoscopic image can be properly viewed. For example, the stereoscopic display device of Patent Document 1 uses some of the pixels on the liquid crystal display panel to indicate such a position to the viewer.

A stereoscopic display device using binocular parallax allows two images from different viewpoints, entering the left and right eyes, to be coupled in the head (in the brain) of the viewer, thereby allowing the viewer to perceive depth or a stereoscopic effect. As such, the position from where a stereoscopic image can be properly viewed varies depending on the viewer. Consequently, it is desirable that each viewer be guided to the position where he can view the stereoscopic image properly, on a viewer-to-viewer basis.

The stereoscopic display device of Patent Document 1 only indicates a predetermined position to the viewer. Thus, some viewers may not be able to see a stereoscopic image properly even when he follows such an indication of a position for the viewer.

DISCLOSURE OF THE INVENTION

An object of the present invention is to provide a novel stereoscopic display device that allows the viewer to properly view a stereoscopic image.

The stereoscopic display device of the present invention includes: a display configured to display an image for stereoscopic viewing; an imaging unit configured to image a face of a viewer; a position information acquisition unit configured to acquire position information regarding the face imaged by the imaging unit; an operation unit configured to be operated by the viewer when the viewer is in an optimal position from where the image for stereoscopic viewing displayed on the display can be properly viewed as a stereoscopic image; an optimal position information storage unit configured to store position information provided when the operation unit is operated as position information on the optimal position; and a positional relationship notification unit configured to notify the viewer of a positional relationship between a current position of the viewer and the optimal position.

The stereoscopic display device of the present invention allows the viewer to properly view stereoscopic images.

EMBODIMENTS FOR CARRYING OUT THE INVENTION

Figure 1:
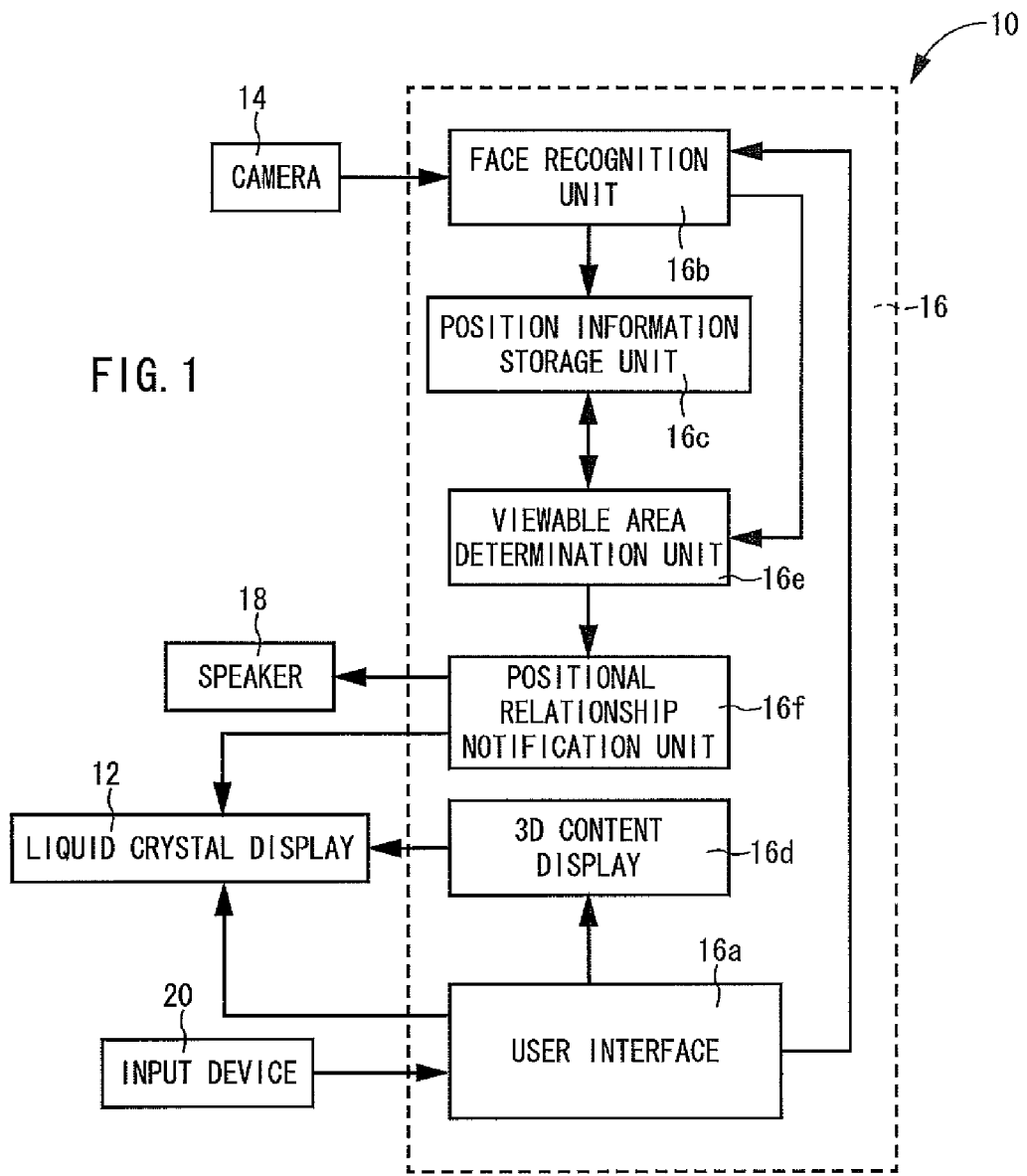
FIG. 1 is a block diagram illustrating a stereoscopic display device of a first embodiment of the present invention.

The stereoscopic display device of an embodiment of the present invention includes: a display configured to display an image for stereoscopic viewing; an imaging unit configured to image a face of a viewer; a position information acquisition unit configured to acquire position information regarding the face imaged by the imaging unit; an operation unit configured to be operated by the viewer when the viewer is in an optimal position from where the image for stereoscopic viewing displayed on the display can be properly viewed as a stereoscopic image; an optimal position information storage unit configured to store position information provided when the operation unit is operated as position information on the optimal position; and a positional relationship notification unit configured to notify the viewer of a positional relationship between a current position of the viewer and the optimal position (first arrangement).

According to the first arrangement of the stereoscopic display device, the viewer is notified of the positional relationship between an optimal position preset by the viewer himself and his current position. As such, each viewer may be guided to his own optimal position on a viewer-to-viewer basis. This allows the viewer to properly view stereoscopic images.

A second arrangement of the stereoscopic display device is configured in such a way that, in the first arrangement, the positional relationship notification unit displays, on the display, the positional relationship between the current position of the viewer and the optimal position. In this arrangement, both a content of notification by the positional relationship notification unit and an image for stereoscopic viewing may be put in the field of view of the viewer. As a result, the viewer can easily determine the positional relationship between his current position and the optimal position.

A third arrangement of the stereoscopic display device is configured in such a way that, in the second arrangement, the positional relationship notification unit includes: an offset determination unit configured to determine whether a distance between the current position of the viewer and the optimal position is within a predetermined acceptable range; a continuation determination unit configured, if the offset determination unit has determined that the distance between the current position of the viewer and the optimal position is within the acceptable range, to determine whether the distance between the current position of the viewer and the optimal position has continuously been within the acceptable range for a certain period of time; and a display termination unit configured, if the continuation determination unit has determined that the distance between the current position of the viewer and the optimal position has continuously been within the acceptable range for the certain period of time, to cause the positional relationship between the current position of the viewer and the optimal position to cease to be displayed on the display. In this arrangement, if stereoscopic images have been visible for a certain period of time, the positional relationship between the current position of the viewer and the optimal position ceases to be displayed on the display. As a result, the viewer does not get annoyed by the displayed positional relationship between his current position and the optimal position (i.e. the content of notification by the positional relationship notification unit), visible on the display.

A fourth arrangement of the stereoscopic display device is configured in such a way that, in the third arrangement, the positional relationship notification unit includes a display resuming unit configured, if the offset determination unit has determined that the distance between the current position of the viewer and the optimal position is outside the acceptable range after the display termination unit caused the positional relationship between the current position of the viewer and the optimal position to cease to be displayed on the display, to cause the positional relationship between the current position of the viewer and the optimal position to be displayed on the display again. In this arrangement, when the viewer moves off the optimal position, the relationship between his current position and the optimal position is displayed again on the display. As a result, the viewer can notice that he is not seeing stereoscopic images properly.

A fifth arrangement of the stereoscopic display device is configured in such a way that, in the third or fourth arrangement, an acceptable range modification unit configured to modify the acceptable range is included. In this arrangement, the acceptable range may be changed depending on the viewer. As a result, the viewer may be properly guided to his optimal position.

A sixth arrangement of the stereoscopic display device is configured in such a way that, in one of the first to fifth arrangements, the positional relationship notification unit notifies the viewer of the positional relationship between the current position of the viewer and the optimal position in the form of audio information. Particularly, combining this arrangement with one of the second to fifth arrangements makes it possible to notify the viewer of the positional relationship between his current position and the optimal position by means of the senses of both sight and hearing of the viewer. As a result, the viewer can easily determine the distance between the optimal position and himself.

The seventh arrangement of the stereoscopic display device is configured in such a way that, in one of the first to sixth arrangements, the display displays a stereoscopic image using a parallax barrier technique.

The eighth arrangement of the stereoscopic display device is configured in such a way that, in one of the first to sixth arrangements, the display displays a stereoscopic image using a lenticular technique.

Now, more specific embodiments of the present invention will be described with reference to the drawings. For ease of explanation, the drawings referred to below are simplified and show only those components of the embodiments of the present invention that are necessary to illustrate the present invention. Accordingly, the stereoscopic display device of the present invention may include components not shown in any of the drawings referred to herein. Further, the sizes of the components in the drawings do not exactly represent the sizes of the actual components or the size ratios of the components.

First Embodiment

FIG. 1 shows a block diagram of a stereoscopic display device 10 of a first embodiment of the present invention. The stereoscopic display device 10 includes: a liquid crystal display 12, which serves as the display; a camera 14, which serves as the imaging unit; a control device 16; a speaker 18; and an input device 20. Examples of the stereoscopic display device 10 include, for example, portable information terminals such as personal digital assistants (PDAs), game machines, and desktop and laptop personal computers. The stereoscopic display device 10 allows the viewer to view a stereoscopic image using binocular parallax.

The liquid crystal display 12 is a three-dimensional (3D) display having a presettable position from where an image for stereoscopic viewing displayed in a display region 26 (see FIG. 2) can be properly viewed as a stereoscopic image (i.e. an optimal position). In brief, the liquid crystal display 12 includes a display main panel and a switch liquid crystal panel, not shown.

To allow the viewer to view a stereoscopic image on the liquid crystal display 12, the display main panel displays an image for stereoscopic viewing to be viewed by the right eye (i.e. a right eye image) and an image for stereoscopic viewing to be viewed by the left eye (i.e. a left eye image), their separate portions being arranged in an alternating manner. To allow the viewer to view a planar image on the liquid crystal display 12, the display main panel displays a planar image.

To allow the viewer to view a stereoscopic image on the liquid crystal display 12, the switch liquid crystal panel displays a striped parallax barrier. To allow the viewer to view a planar image on the liquid crystal display 12, the switch liquid crystal panel does not display a parallax barrier.

To allow the viewer to view a stereoscopic image, the liquid crystal display 12 as described above shows the viewer a right eye image and a left eye image displayed on the display main panel through a parallax barrier displayed on the switch liquid crystal panel. Thus, only right eye images reach the right eye of the viewer, while only left eye images reach the left eye of the viewer. As a result, the viewer perceives stereoscopic images without glasses. In other words, the present embodiment employs parallax barrier techniques to display stereoscopic images on the liquid crystal display 12.

The camera 14 is a video camera with charge-coupled device (CCD) image sensors serving as solid-state image sensing devices, for example. The camera 14 may be embedded, for example, in a portion of the housing of the liquid crystal display 12 that is located above the display region 26 (see FIG. 2). Alternatively, the camera may be attached to the external surface of the housing of the liquid crystal display 12, for example. When the viewer is allowed to view a stereoscopic image on the liquid crystal display 12, the camera 14 is capable of constantly imaging the front side of the face of the viewer.

The camera 14 is connected to the control device 16. Thus, an image of the face of the viewer imaged by the camera 14 may be sent to the control device 16.

The control device 16 includes a plurality of functional units 16a to 16f. Specifically, the control device 16 includes a user interface 16a, face recognition unit 16b, position information storage unit 16c, 3D content display unit 16d, viewable area determination unit 16e, and positional relationship notification unit 16f. These functional units 16a to 16f work together to allow the viewer to properly view stereoscopic images.

If the control device 16 includes a central processing unit and memory, for example, these functional units 16a to 16f may be implemented by the central processing unit reading a program stored in the memory and executing it. Alternatively, these functional units 16a to 16f may be implemented by a devoted integrated circuit.

The main function of the user interface 16a is to exchange information with the viewer when the viewer is in the process of presetting an optimal position. Manners of exchanging information with the viewer include, for example, issuing an instruction to the viewer and receiving an instruction from the viewer. Information may be exchanged via a graphical user interface (GUI), for example. Specifically, for example, a button, an icon or the like may be displayed in the display region 26 of the liquid crystal display 12 (see FIG. 2) and the viewer may operate the button, the icon or the like using a pointing device such as a mouse, a touch panel or the like.

The main function of the face recognition unit 16b is to recognize the face of the viewer as imaged by the camera 14 and to acquire position information regarding the face. For example, pattern recognition may be employed to acquire position information regarding the face of the viewer. In the present embodiment, for example, the position of each of the eyes of the viewer (the pupils of the eyes, for example) may be identified and the middle point of the line segment that connects the centers of the eyes (pupils, for example) may be treated as the center of the face of the viewer as measured in a horizontal direction. The center of the face as measured in a horizontal direction identified in this manner and a predetermined reference position may be used to acquire the current position of the viewer. The predetermined reference position may be, for example, the location on the liquid crystal display 12 where the camera 14 is mounted.

The main function of the position information storage unit 16c is to store position information regarding the face of the viewer as located in the optimal position. Specifically, for example, position information regarding the center of the face of the viewer measured in a horizontal direction relative to the predetermined reference position acquired when the user interface 16a receives an instruction from the viewer may be stored as position information regarding the optimal position.

The main function of the 3D content display unit 16d is to display to the viewer a stereoscopic image on the liquid crystal display 12. Stereoscopic images displayed to the viewer on the liquid crystal display 12 include, for example, stereoscopic images that the viewer wishes to view (a movie, for example), as well as a sample stereoscopic image displayed to the viewer when an optimal position is to be preset. It is desirable that the sample stereoscopic images be, for example, an image with a parallax of 1 degree or less, a simple stereoscopic image such as of a sphere or cube, or a still image, for the purpose of being viewable to as many viewers as possible, or for other purposes.

One of the main functions of the viewable area determination unit 16e is to compare the position information regarding the face of the viewer acquired by the face recognition unit 16b with the position information regarding the face of the viewer as located in the optimal position stored by the position information storage unit 16c. In the present embodiment, the center, as measured in a horizontal direction, of the face of the viewer as located in the current position may be compared with the center, as measured in a horizontal direction, of the face of the viewer as located in the optimal position.

The main function of the positional relationship notification unit 16f is to notify the viewer of the positional relationship between the face of the viewer as imaged by the camera 14 (i.e. the face of the viewer as located in the current position) and the face of the viewer as located in the optimal position stored in the position information storage unit 16c. In the present embodiment, the viewer may be notified of results from the viewable area determination unit 16e via a level meter 22 (see FIG. 2) displayed in the display region 26 (see FIG. 2) of the liquid crystal display 12, together with a beep produced by the speaker 18.

Figure 2:
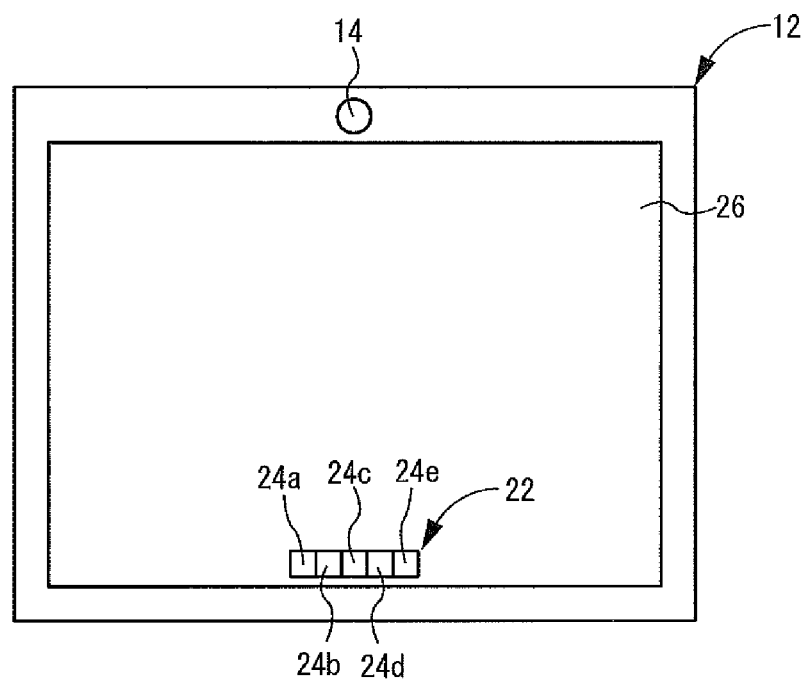
FIG. 2 illustrates a level meter displayed in the display region of the liquid crystal display in the stereoscopic display device illustrated in FIG. 1.

The level meter 22 may include, for example, five regions 24a to 24e disposed in a row in a horizontal direction across the display region 26 of the liquid crystal display 12 (i.e. in a left-to-right direction in FIG. 2), as shown in FIG. 2. The level meter may notify the viewer of his current position by displaying a region 24 corresponding to his current position in a different color from that of the other regions 24.

Figure 3:
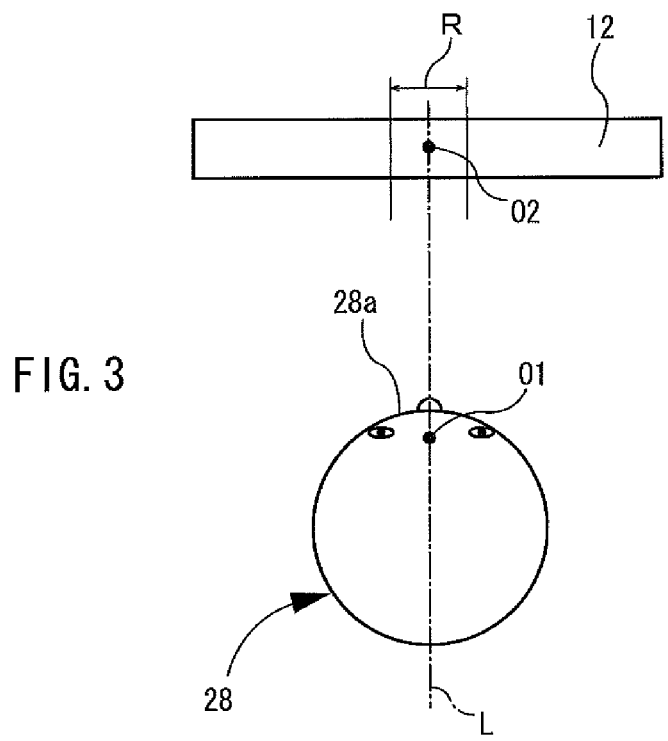
FIG. 3 illustrates the viewer being located in an optimal position.

Specifically, if the current position of the viewer coincides with the optimal position, the central region 24c of the level meter 22 is displayed in green. The current position of the viewer coinciding with the optimal position means that the center, as measured in a horizontal direction, of the face of the viewer as located in the current position coincides with the center, as measured in a horizontal direction, of the face of the viewer as located in the optimal position. That is, the current position of the viewer coinciding with the optimal position means that, as shown in FIG. 3, a center line L, passing the center O1 of the face 28a of the viewer 28 as measured in a horizontal direction passes the center O2, as measured in a horizontal direction, of the face 28a of the viewer 28 as located in the optimal direction.

When the current position of the viewer does not coincide with the optimal position, different colors are used in the regions 24, which each correspond to a current position of the viewer, depending on the distance between the current position and the optimal position.

Figure 4:
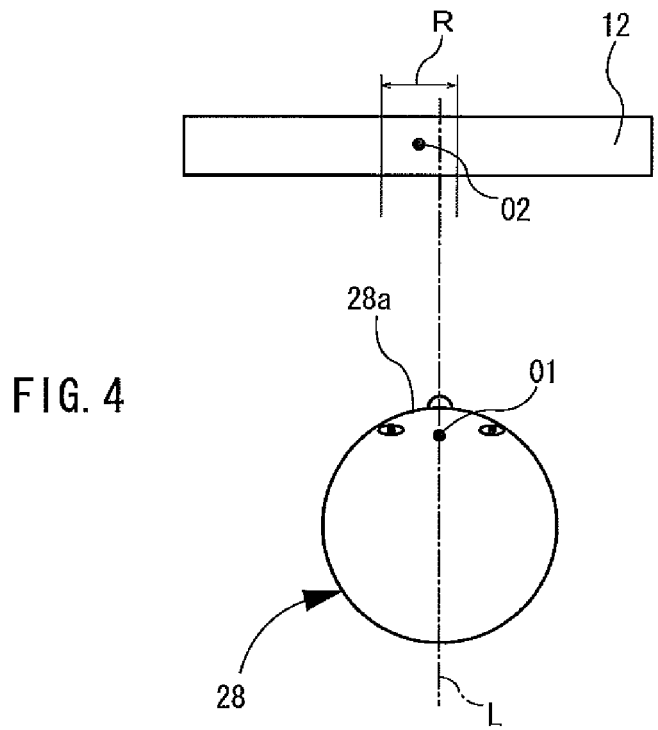
FIG. 4 illustrates the viewer being located within an acceptable range.

For example, if the current position of the viewer does not coincide with the optimal position but is within a predetermined acceptable range, one of the regions 24b and 24d, next to the central region 24c, of the level meter 22 is displayed in yellow. The current position of the viewer not coinciding with the optimal position but being within a predetermined acceptable range means that, as shown in FIG. 4, the center line L passing the center O1 of the face 28a of the viewer 28 as measured in a horizontal direction passes a location within the acceptable range R. Since in FIG. 4, the center line L passing the center O1 of the face 28a of the viewer 28 as measured in a horizontal direction passes a location to the right of the center O2, as measured in a horizontal direction, of the face 28a of the viewer 28 as located in the optimal position and within the acceptable range R, the region 24d, next to the central region 24c to the right, of the level meter 22 is displayed in yellow.

The acceptable range is the range in a horizontal direction across the display in which the viewer can move and still view a stereoscopic image properly, where the center, as measured in a horizontal direction, of the face of the viewer as located in the optimal position is the center of the acceptable range. An acceptable range is preset so as not to cause a situation in which right eye images reach the left eye of the viewer and left eye images reach the right eye of the viewer (i.e. so-called "reversed stereoscopy"). An acceptable range having a dimension substantially equal to the distance between the eyes of the viewer, for example, may be preset.

Figure 5:
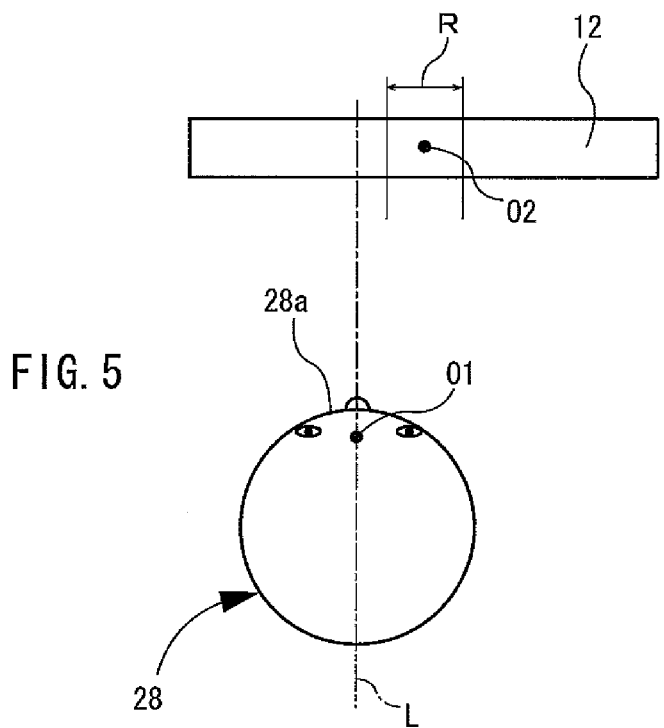
FIG. 5 illustrates the viewer being located outside the acceptable range.

If the current position of the viewer is outside the predetermined acceptable range, one of the regions 24a and 24e located at the ends of the level meter 22 is displayed in red. The current position of the viewer being outside the predetermined acceptable range means that, as shown in FIG. 5, the center line L passing the center 01 of the face 28a of the viewer 28 as measured in a horizontal direction passes a location outside the acceptable range R. Since in FIG. 5, the center line L passing the center 01 of the face 28a of the viewer 28 as measured in a horizontal direction passes a location outside the acceptable range R to the left, the region 24a, located at the left end of the level meter 22, is displayed in red.

The background of the level meter 22 may be in any color.

The input device 20 is used to provide an instruction into the control device 16 (or the user interface 16a). The input device 20 may be, for example, a key board or mouse, or a touch panel.

Now, a control process performed by the control device 16 (more particularly, the functional units 16a to 16f included in the control device 16) to allow the viewer to see stereoscopic images that he wishes to view (a movie, for example) on the liquid crystal display 12 will be described with reference to FIG. 6. This control process is performed when the viewer attempts to view the desired stereoscopic images (a movie, for example).

Figure 7:
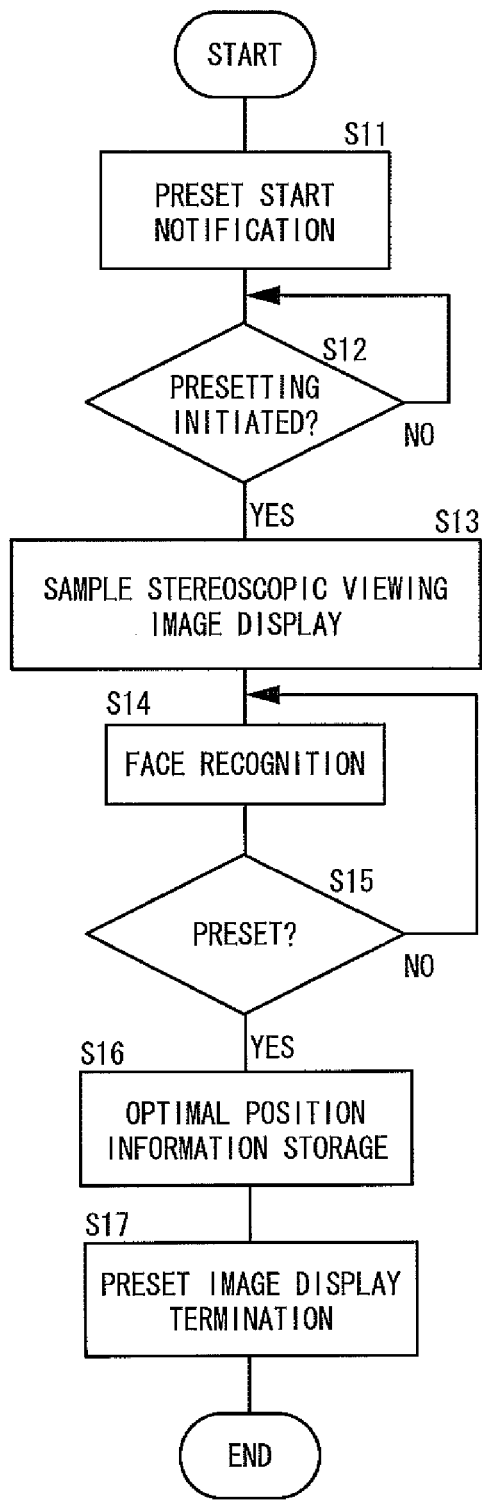
FIG. 7 is a flow chart illustrating the optimal position presetting in the control process illustrated in FIG. 6.

First, the control device 16 performs optimal position presetting at step (hereinafter referred to as "S") 1. This optimal position presetting will be described with reference to FIG. 7.

Figure 8:
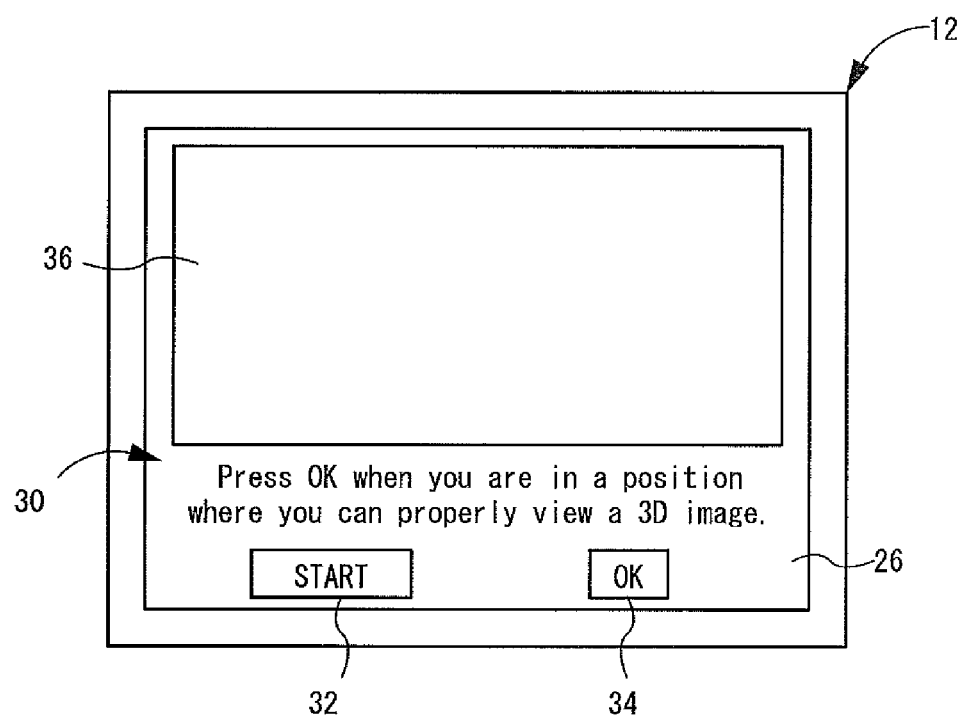
FIG. 8 illustrates what is displayed in the display region of the liquid crystal display during the preset start notification in the optimal position presetting illustrated in FIG. 7.

First, at S11, the control device 16 (or the user interface 16a) performs preset start notification. This preset start notification displays, in the display region 26 of the liquid crystal display 12, a message that indicates that the presetting of an optimal position will be initiated. A message indicating that the presetting of an optimal position will be initiated may include, for example, an instruction message 30 that says: "Press OK when you are in a position where you can properly view a 3D image." and a start icon 32 and OK icon 34, as shown in FIG. 8.

The start icon 32 may be pressed to initiate the presetting of an optimal position. The OK icon 34 may be pressed to preset an optimal position. The start icon 32 and OK icon 34 may be pressed by, for example, using a mouse, which serves as the input device 20, to move a pointer (not shown) displayed in the display region 26 onto the icon 30 or 32 and then clicking a mouse button.

Next, at S12, the control device 16 (or the user interface 16a) determines whether the presetting of an optimal position has been initiated. Specifically, the control device determines whether the start icon 32 has been pressed.

If the start icon 32 has not yet been pressed (NO at S12), the control device 16 (or the user interface 16a) waits until the start icon 32 is pressed. If the start icon 32 has been pressed (YES at S12), the control device 16 (or the 3D content display unit 16d) performs sample stereoscopic viewing image display at S13.

The sample stereoscopic viewing image display displays a sample image for stereoscopic viewing in the display region 26 of the liquid crystal display 12 to allow the viewer to view a sample stereoscopic image. In the present embodiment, a sample image for stereoscopic viewing is displayed in a sample display region 36 (see FIG. 8), located above the instruction message 30, start icon 32 and OK icon 34, to show the viewer a sample image for stereoscopic viewing. The sample image for stereoscopic viewing is displayed in the sample display region 36 until the process in S17 (preset image display termination), discussed below, is performed.

Subsequently, at S14, the control device 16 (or the face recognition unit 16b) performs face recognition. The face recognition acquires position information regarding the center of the face of the viewer as measured in a horizontal direction based on image data regarding the face of the viewer that has been imaged by the camera 14.

Then, at S15, the control device 16 (or the user interface 16a) determines whether an optimal position has been preset. Specifically, it determines whether the OK icon 34 displayed in the display region 26 of the liquid crystal display 12 has been pressed. If the OK icon 34 has not been pressed (NO at S15), the control device 16 (or the face recognition unit 16 b and user interface 16a) repeats the processes in S14 and S15 until the OK icon 34 is pressed.

If the OK icon 34 has been pressed (YES at S15), the control device 16 (or the position information storage unit 16c) performs optimal position information storage at S16. The optimal position information storage stores the current position of the face of the viewer, i.e. the position information regarding the center of the face of the viewer as measured in a horizontal direction acquired in the face recognition (S14) as position information on the optimal position.

After performing the optimal position information storage, the control device 16 (or the user interface 16a) performs preset image display termination at S17. The preset image display termination causes the instruction message 30, start icon 32 and OK icon 34 to cease to be displayed in the display region 26 of the liquid crystal display 12 and the sample image for stereoscopic viewing to cease to be displayed in the sample display region 26.

Upon termination of the preset image display, the control device 16 terminates the optimal position presetting (S1) shown in FIG. 5.

Figure 6:
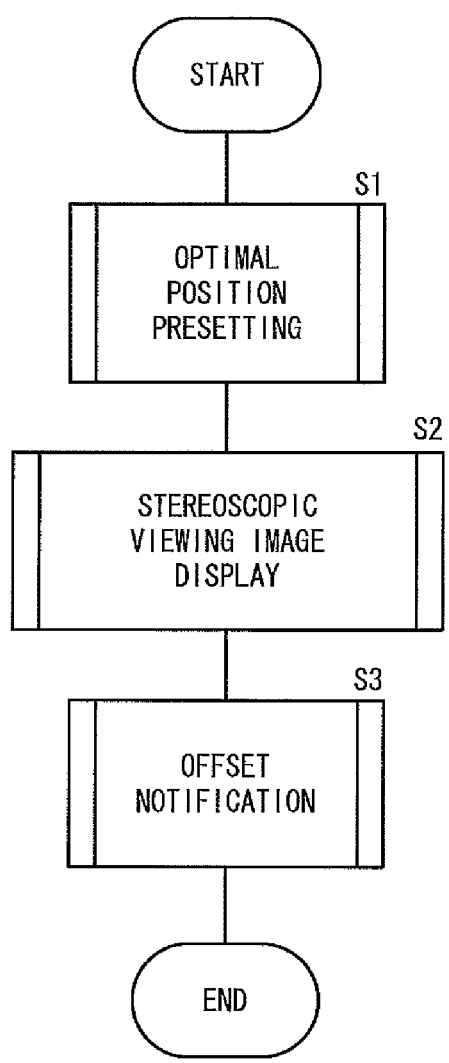
FIG. 6 is a flow chart illustrating a control process performed by the control device when the liquid crystal display of the stereoscopic display device illustrated in FIG. 1 shows a stereoscopic image to the viewer.

Upon termination of the optimal position presetting, the control device 16 (or the 3D content display unit 16d) performs stereoscopic viewing image display, as shown in FIG. 6, at S2. The stereoscopic viewing image display displays an image for stereoscopic viewing in the display region 26 of the liquid crystal display 12 to allow the viewer to view the desired stereoscopic images (a movie, for example) and displays the level meter 22 in the display region 26 of the liquid crystal display 12. Images for stereoscopic viewing may be displayed in the display region 26 until the viewer performs an operation to interrupt the display of images for stereoscopic viewing, for example.

Figure 9:
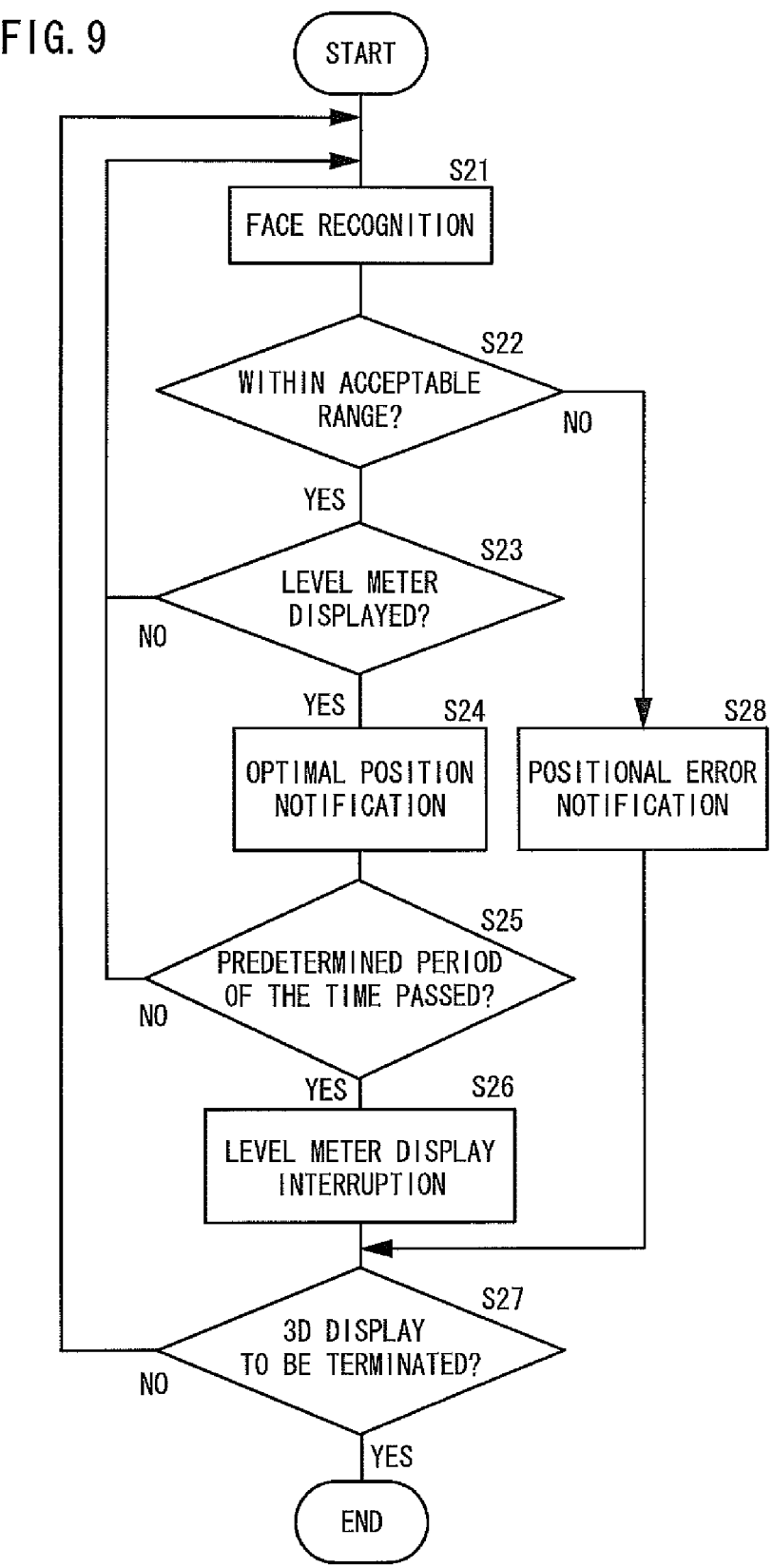
FIG. 9 is a flow chart illustrating the offset notification in the control process illustrated in FIG. 6.

During stereoscopic viewing image display, the control device 16 performs offset notification at S3. The offset notification will be described with reference to FIG. 9.

First, at S21, the control device 16 (or the face recognition unit 16b) performs face recognition. The face recognition acquires position information regarding the center of the face of the viewer as measured in a horizontal direction based on image data regarding the face of the viewer that has been imaged by the camera 14.

Next, at S22, the control device 16 (or the viewable area determination unit 16e) determines whether the viewer is in the optimal position, or is within the acceptable range. Specifically, it determines whether the difference between the center of the face of the viewer as measured in a horizontal direction acquired in the face recognition (S21) (the center, as measured in a horizontal direction, of the face of the viewer as located in the current position) and the center, as measured in a horizontal direction, of the face of the viewer stored during the optimal position information storage (S16) (the center, as measured in a horizontal direction, of the face of the viewer located in the optimal position) is within the acceptable range.

If the difference between the current position and the optimal position is within the acceptable range (YES at S22), the control device 16 (or the positional relationship notification unit 16f) determines, at S 23, whether the level meter 22 is being displayed in the display region 26 of the liquid crystal display 12. If the level meter 22 is not displayed (NO at S23), the control device 16 performs the processes in S21 and subsequent steps. If the level meter 22 is displayed (YES at S23), the control device 16 performs optimal position notification at S24.

The optimal position notification displays the one of the regions 24 of the level meter 22 that corresponds to the current position of the viewer in a different color from that of the other regions 24 to notify of the viewer that he is in the optimal position or within the acceptable range, which accommodates a predetermined distance from the optimal position. If the viewer is in the optimal position, the central region 24c of the level meter 22 is displayed in green while the other regions 24 are displayed in white, for example. If the viewer is not in the optimal position but within the acceptable range, one of the regions 24b and 24d of the level meter 22, next to the central region 24c, is displayed in yellow while the other regions 24 are displayed in white, for example.

Upon termination of the optimal position notification, the control device 16 (or the viewable area determination unit 16e) determines, at S25, whether the central region 24c or one of the regions 24b and 24d next to the central region 24c of the level meter 22 has been displayed in a different color from that of the other regions 24 for a predetermined period of time (5 minutes, for example). If not (NO at S25), the control device 16 repeats the processes in S21 and subsequent steps.

If such a region has been displayed in a different color for a predetermined period of time (YES at S25), the control device 16 (or the positional relationship notification unit 16f) performs level meter display interruption to interrupt the display of the level meter 22 at S26. Thus, the level meter 22 ceases to be displayed in the display region 26 of the liquid crystal display 12.

Subsequently, at S27, the control device 16 (or the user interface 16a) determines whether the liquid crystal display 12 has ceased to allow the viewer to view the desired stereoscopic images. If the liquid crystal display 12 has not ceased to allow the viewer to view the desired stereoscopic images (NO at S27), the control device 16 performs the processes in S21 and subsequent steps.

If the liquid crystal display 12 has ceased to allow the viewer to view the desired stereoscopic images (YES at S27), the control device 16 terminates the offset notification (S3). Thus, the control process shown in FIG. 5 is completed.

If the distance between the current position and the optimal position is outside the acceptable range (NO at S22), the control device 16 (or the positional relationship notification unit 16f) performs positional error notification at S28. The positional error notification displays on the level meter 22 how distant the viewer is from the optimal position, and produces a beep from the speaker 18 to notify the viewer that he is outside the acceptable range. Specifically, one of the regions 24a and 24e at the ends of the level meter 22 is displayed in red while the other regions 24 are displayed in white, for example. In addition to such display on the level meter 22, a beep is produced by the speaker 18.

Upon termination of the positional error notification, the control device 16 performs the processes in S27 and subsequent steps.

As is apparent from the above description, in the present embodiment, the position information acquisition unit is implemented by having the control device 16 perform S14 or S21. In the present embodiment, the operating unit is implemented by the input device 20 and the OK icon 34 displayed in the display region 26 of the liquid crystal display 12. In the present embodiment, the position information storage unit is implemented by having the control device 16 perform S16. In the present embodiment, the positional relationship notification unit is implemented by having the control device 16 perform S3. In the present embodiment, the offset determination unit is implemented by having the control device 16 perform S22. In the present embodiment, the continuation determination unit is implemented by having the control device 16 perform S25. In the present embodiment, the display termination unit is constructed by having the control device 16 perform S26. In the present embodiment, the display resuming unit is implemented by having the control device 16 perform S28 while the level meter 22 is not displayed.

In such a stereoscopic display device 10, when an image for stereoscopic viewing is displayed in the display region 26 of the liquid crystal display 12 to allow a viewer to view the desired stereoscopic images on the liquid crystal display 12, a level meter 22 is displayed in the display region 26 of the liquid crystal display 12 (S24 and S28). This allows the viewer to check the positional relationship between his current position and an optimal position while viewing the desired stereoscopic images.

Thus, the stereoscopic display device 10 is able to guide the viewer to an optimal position. As a result, the viewer can properly view a stereoscopic image.

In the stereoscopic display device 10, an optimal position is preset by the viewer himself (YES at S15, and S16). Thus, the viewer may be precisely guided to an optimal position with the help of the level meter 22.

In the stereoscopic display device 10, the positional relationship between the current position of the viewer and the optimal position is indicated by the level meter 22 (S24 and S28). This makes it possible to notify the viewer of the positional relationship between his current position and the optimal position in an easily understandable manner.

In the stereoscopic display device 10, the level meter 22 is displayed in the display region 26 of the liquid crystal display 12 (S24 and S28). Thus, the stereoscopic display device 10 may be manufactured more easily than a device with a separate region dedicated to displaying the level meter 22.

In the stereoscopic display device 10, the level meter 22 ceases to be displayed when the viewer has been in the optimal position or within the acceptable range for a predetermined period of time (YES at S25, and S26). This prevents the viewer from getting annoyed by the level meter 22.

In the stereoscopic display device 10, the level meter 22 is displayed differently between when the viewer is in the optimal position and when he is not in the optimal position but within the acceptable range (S24). This allows the viewer to easily determine in which direction he is located relative to the optimal position.

In the stereoscopic display device 10, the speaker 18 produces a beep when the viewer is outside the acceptable range (S28). This makes it possible to notify the viewer of the positional relationship between his current position and the optimal position via not only the sense of sight but also the sense of hearing.

Second Embodiment

Next, a stereoscopic display device of a second embodiment of the present invention will be described. In the description below, the components and parts considered to have a similar configuration to the first embodiment are labeled with the same characters as in the first embodiment and thus their detailed description will not be given.

Figure 10:
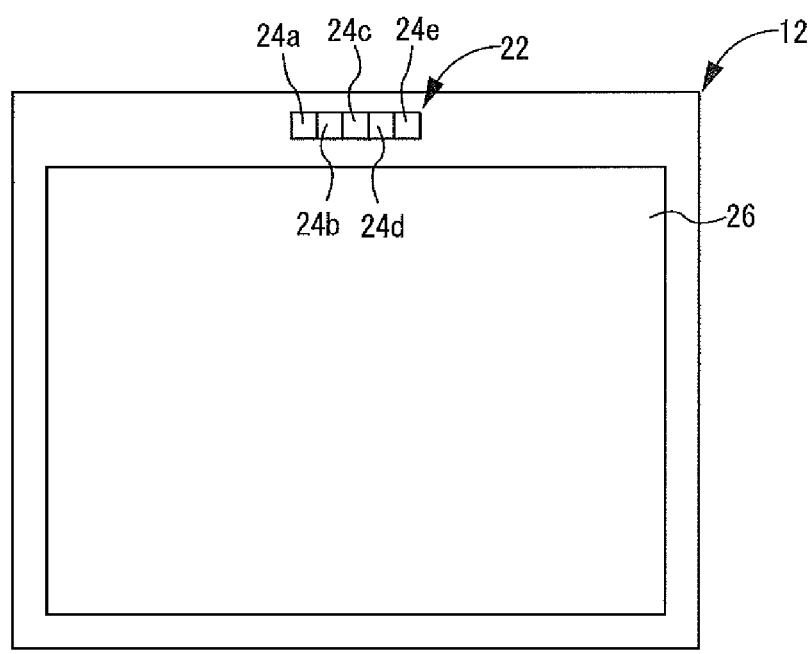
FIG. 10 illustrates a liquid crystal display employed in a stereoscopic display device of a second embodiment of the present invention.

As compared with the stereoscopic display device 10 of the first embodiment, the stereoscopic display device of the present embodiment includes a level meter 22 provided outside the display region 26 of the liquid crystal display 12 (i.e. on the housing of the liquid crystal display 12), as shown in FIG. 10. This prevents the level meter 22 from making the viewer get annoyed when an image for stereoscopic viewing is displayed in the display region 26 of the liquid crystal display 12 to allow the viewer to view the desired stereoscopic images on the liquid crystal display 12.

Figure 11:
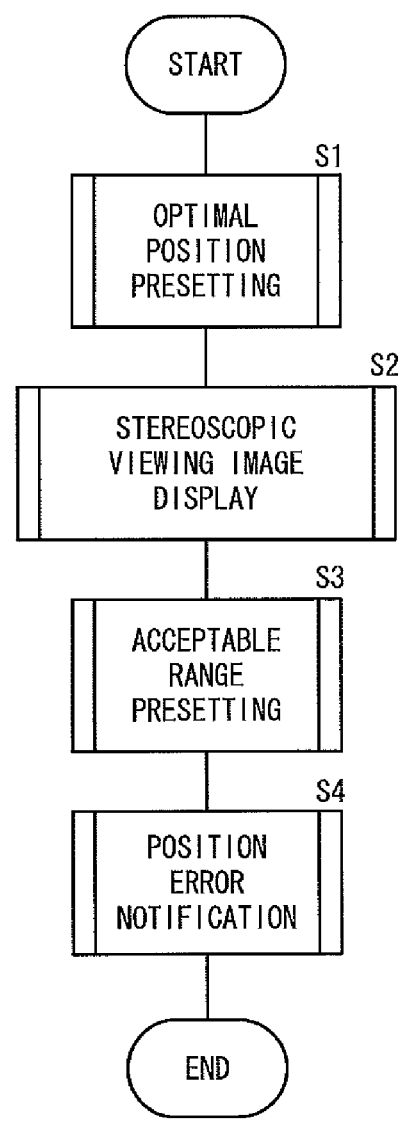
FIG. 11 is a flow chart illustrating a control process performed by the control device when the liquid crystal display of the stereoscopic display device of the second embodiment of the present invention shows a stereoscopic image to the viewer.

Further, in the present embodiment, the control process performed by the control device 16 to allow the viewer to view the desired stereoscopic images on the liquid crystal display 12 is different from that of the first embodiment. Specifically, as shown in FIG. 11, acceptable range presetting (S3) is performed after the stereoscopic viewing image display (S2) and before the offset notification (S4). S1, S2 and S4 in FIG. 11 are the same as S1, S2 and S3 of the first embodiment.

In the acceptable range presetting (S3), the viewer presets an acceptable range. Specifically, in implementations where a blank into which an acceptable range may be entered is displayed in the display region 26 of the liquid crystal display 12, the viewer may preset an acceptable range by entering a value in the blank. In such implementations, a range of values that can be entered by the viewer may be indicated. Alternatively, a plurality of predetermined acceptable ranges may be displayed in the display region 26 of the liquid crystal display 12 and the viewer may select one out of these acceptable ranges to preset an acceptable range. As is apparent from the above, in the present embodiment, the acceptable range modification unit may be implemented by having the control device 16 perform S3.

In the stereoscopic display device of the present embodiment, the viewer can change the acceptable range. Thus, the viewer may optimize for himself the manner in which the level meter 22 guides him to an optimal position.

Although embodiments of the present invention have been illustrated in detail, the embodiments are merely examples and the present invention is not limited, in any way, to the embodiments above.

For example, the position information regarding the face of the viewer may be, other than position information indicating how distant in a horizontal direction across the display the face is from a predetermined reference position (i.e. the position where the imaging unit is attached, for example), position information indicating how distant in a vertical direction across the display the face is from a predetermined reference position or position information indicating how distant the face is from the display, for example. Position information regarding the face of the viewer may be composed of position information of different types.

The viewer may be notified of the positional relationship between his current position and the optimal position only via a sound.

In the first and second embodiments, for example, when the viewer is in the optimal position or within the acceptable range, the central region 22c of the level meter 22 may be displayed in green. When the viewer is outside the acceptable range, the regions 24b and 24d of the level meter 22 may be displayed in yellow. In such implementations, the level meter 22 may include, for example, regions 24b, 24c and 24d. Each of the regions 24a and 24e of the level meter 22 may include a plurality of subregions to notify the viewer, if he is outside the acceptable range, of the distance between him and the acceptable range in a stepwise manner.

Techniques used to display stereoscopic images on the display are not limited to parallax barrier techniques which are employed in the first and second embodiments. Any techniques for displaying a stereoscopic image that can be employed in a display having a predetermined position where the stereoscopic image can be properly viewed (optimal position) may be employed. For example, lenticular techniques may be employed for displaying a stereoscopic image on the display. The display using lenticular techniques for displaying a stereoscopic image may be implemented by replacing the switch liquid crystal panel in the liquid crystal display 12 of the first or second embodiments with a lenticular lens and disposing the lenticular lens in front of the display main panel, for example.

The invention claimed is:

1. A stereoscopic display device comprising,
    a display configured to display an image for stereoscopic viewing;
    an imaging unit configured to image a face of a viewer;
    a position information acquisition unit configured to acquire position information regarding the face imaged by the imaging unit;
    an operation unit configured to be operated by the viewer when the viewer is in an optimal position from where the image for stereoscopic viewing displayed on the display can be properly viewed as a stereoscopic image;
    an optimal position information storage unit configured to store position information provided when the operation unit is operated as position information on the optimal position; and
    a positional relationship notification unit configured to notify the viewer of a positional relationship between a current position of the viewer and the optimal position,
    wherein the positional relationship notification unit includes:
        an offset determination unit configured to determine whether a distance between the current position of the viewer and the optimal position is within a predetermined acceptable range;
        a continuation determination unit configured, if the offset determination unit has determined that the distance between the current position of the viewer and the optimal position is within the acceptable range, to determine whether the distance between the current position of the viewer and the optimal position has continuously been within the acceptable range for a certain period of time;
        a display termination unit configured, if the continuation determination unit has determined that the distance between the current position of the viewer and the optimal position has continuously been within the acceptable range for the certain period of time, to cause the positional relationship between the current position of the viewer and the optimal position to cease to be displayed on the display; and
    the positional relationship notification unit is configured to display, on the display, the positional relationship between the current position of the viewer and the optimal position.

2. The stereoscopic display device according to claim 1, wherein the positional relationship notification unit includes a display resuming unit configured, if the offset determination unit has determined that the distance between the current position of the viewer and the optimal position is outside the acceptable range after the display termination unit caused the positional relationship between the current position of the viewer and the optimal position to cease to be displayed on the display, to cause the positional relationship between the current position of the viewer and the optimal position to be displayed on the display again.

3. The stereoscopic display device according to claim 1, further comprising an acceptable range modification unit configured to modify the acceptable range.

4. The stereoscopic display device according to claim 1, wherein the positional relationship notification unit notifies the viewer of the positional relationship between the current position of the viewer and the optimal position in the form of audio information.

5. The stereoscopic display device according to claim 1, wherein the display displays a stereoscopic image using a parallax barrier technique.

6. The stereoscopic display device according to claim 1, wherein the display displays a stereoscopic image using a lenticular technique.

* * * * *